UNITED STATES PATENT OFFICE.

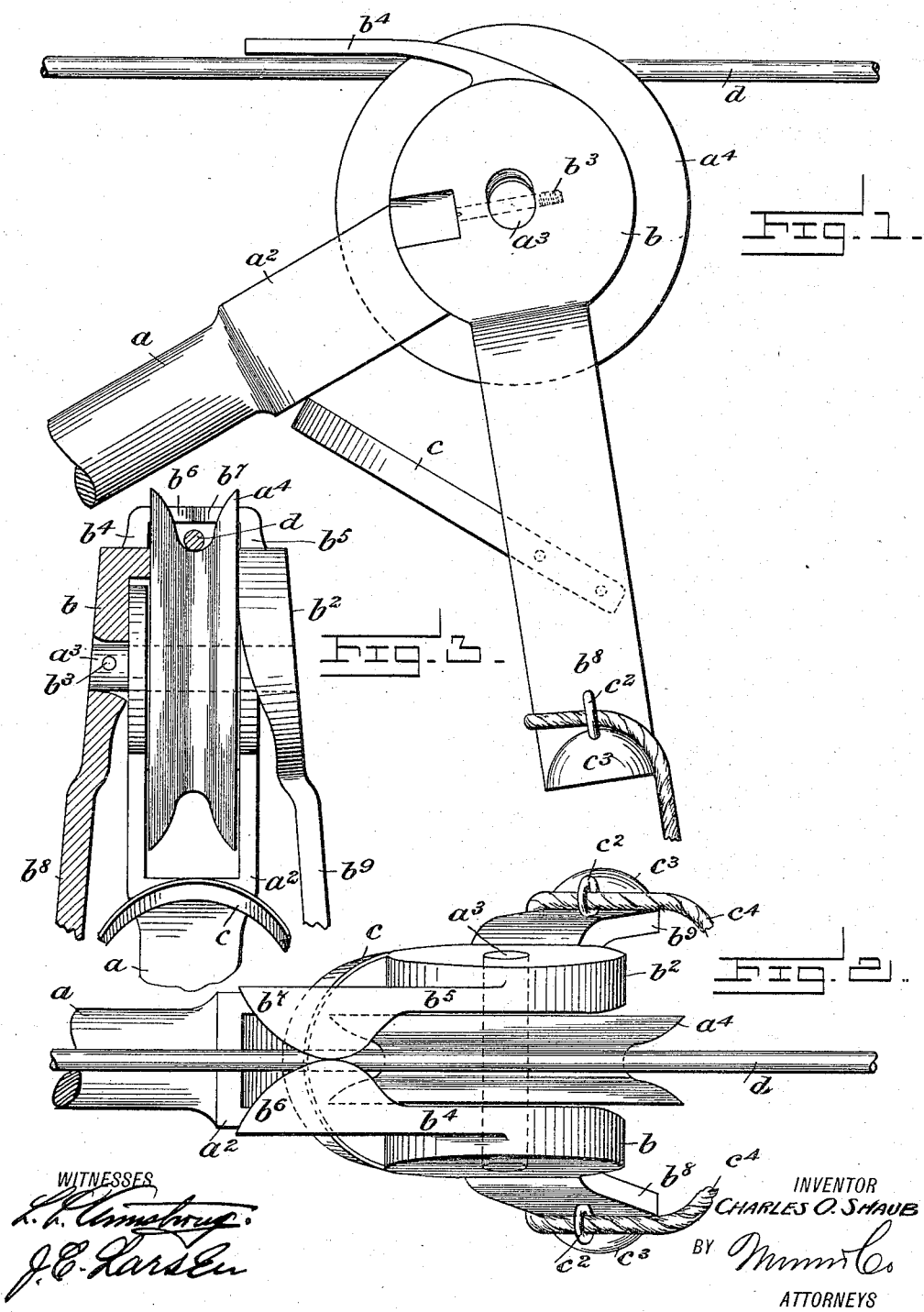

CHARLES OLIVER SHAUB, OF DAYTON, OHIO.

TROLLEY-POLE.

1,146,661.

Specification of Letters Patent.

Patented July 13, 1915.

Application filed April 28, 1914. Serial No. 834,941.

*To all whom it may concern:*

Be it known that I, CHARLES O. SHAUB, a citizen of the United States of America, and resident of Dayton, in the county of Montgomery and State of Ohio, have invented certain new and useful Improvements in Trolley-Poles, of which the following is a specification.

My invention relates to trolley poles, and the main object thereof is to provide a guard for preventing the trolley wheel from accidentally leaving the wire, at switches, crossovers, frogs, etc.

A further object is to so construct the said guard as to permit its passing hangers by the spreading of its members normally held under spring tension.

A further object is to locate the said guard below the peripheries of the wheel flanges whereby the wheel may revolve without interference over hangers, switches, crossovers, etc.; and a further object is to provide means operable by the trolley rope for disengaging the wheel from the wire if desired.

My invention is fully set forth in the following specification, of which the accompanying drawings form a part, in which the separate parts are designated by the same reference characters in each of the views, and in which:—

Figure 1 is a side elevation of the upper end of a trolley pole provided with my invention, and showing the same in operative position; Fig. 2 is a top plan view thereof; and Fig. 3 is a rear view thereof, partly in section.

In the drawings forming a part of this application I have shown a trolley-pole $a$ having the usual or any desired harp $a^2$ at the upper end thereof and through which passes a journal pin $a^3$ for the conventional, grooved, wheel $a^4$.

Loosely mounted upon the extended ends of the pin $a^3$ are two disks $b$ and $b^2$, one on each side of the harp $a^2$ and extending over the upper ends thereof, as clearly shown in Fig. 3 in section, and said disks are pivotally held on said pin by means of pivots $b^3$ arranged in such manner as to permit movement of said disks in substantially vertical planes, said disks being provided with upwardly and forwardly directed arms $b^4$ and $b^5$, respectively, and the outer ends of which are each provided with inwardly directed leaf members $b^6$ and $b^7$, respectively, curved forwardly and rearwardly and touching each other, as clearly shown in Fig. 2, and the disks $b$ and $b^2$ are each provided with a downwardly directed arm $b^8$ and $b^9$, respectively, and which, as clearly shown in Figs. 2 and 3, are also outwardly directed and maintained in this position by means of a band spring $c$ secured, at each end thereof, to the corresponding arm $b^8$ and $b^9$. The arms $b^8$ and $b^9$ are each provided with a staple $c^2$ and with outwardly directed projections $c^3$, the trolley-rope $c^4$ being looped around both arms $b^8$ and $b^9$ and passed through the staples $c^2$, as clearly shown in Figs. 1 and 2, said loop resting upon the projections $c^3$ which are preferably rounded, as shown.

The leaf members $b^6$ and $b^7$ overlie the trolley wire $d$ and, being in close contact, one with the other, prevent the wire from passing therebetween and, said leaf members being in a plane substantially below that of the upper edges of the trolley wheel flanges, said wheel cannot leave the wire, the under surfaces of the leaf members being flat to insure such result but, in view of the curved configuration of the said leaf members, said leaf members may be spread apart by hangers encountered against the tension of the spring $c$, the normal position of said leaf members being immediately resumed after said hanger is passed because of said spring.

The leaf members $b^6$ and $b^7$ being, as stated, below the wheel flanges, clear switch plates, cross-overs, frogs, and the like, permitting the wheel flanges to contact with said trolley wire structural elements, and the guard automatically resumes its position above the wire when such structural elements have been passed. If, however, the car conductor desires to disengage the wheel from the wire, a downward pull on the trolley rope draws the arms $b^8$ and $b^9$ inwardly and thus, because of the pivotal mounting of the disks carrying the said arms and the leaf members forming the guard, the latter are forced sufficiently apart to permit clearance from the wire and downward movement of the trolley-pole, this being done in the event of a return trip of the car and reversing the direction of movement thereof, for it will be understood that the trolley-pole springs are considerably stronger than the band spring $c$ whereby said leaf members are held apart as long as the trolley-pole is held in lowered position by means of the trolley rope but, as soon as this tension on the rope is released, the trolley-pole resumes its normal position with the wheel in contact with the wire and the spring $c$ again closes the leaf members of the guard.

A highly important feature of my invention is the fact that my guard is arranged at a material distance in front of the trolley-wheel for the reason that the guard acts as a guide, preventing the wheel from missing the wire at a cross-over or when leaving a switch and, because of the fact that the guard is on a lower plane than the wheel flange edges, said wheel takes the impact of crossovers or switches when met, instead of the guard, thus preventing injury to the latter which would be likely to occur if the guard took the force of such impact.

It will thus be seen that I insure a constant relationship between the wheel and wire, unless it is desired to separate the same, and that any structural elements of the wire met with are passed without interfering with such relationship, my device being simple, practical, readily installed on any trolley-pole by merely lengthening the journal-pin $a^3$ and drilling the ends thereof for the pivot-pins $b^3$, and comparatively inexpensive and, while I have shown a present preferred form of construction, it will be obvious that I do not limit myself thereto but may modify the same within the scope of the following claims and, with such reservation, what I claim as new and desire to secure by Letters Patent, is:—

A trolley-pole, a harp at the end thereof, a pin passed through said harp, a wheel journaled on said pin, a disk pivoted at each end of said pin and provided, each, with forwardly directed and downwardly directed arms, contacting leaf members on said forwardly directed arms overlying the trolley-wire, said leaf members being curved away from the points of contact in both directions in a horizontal plane, and a trolley-rope connected with said downwardly directed arms whereby they may be moved toward each other to separate said leaf members by tension on said rope and a yoke shaped band spring secured at its ends to said downwardly directed arms and the loop thereof bearing against said harp, said spring serving to maintain said leaf members in contact and preventing movement of said disks on their pivots in one direction, said leaf members limiting the movement thereof in the opposite direction.

In testimony that I claim the foregoing as my invention I have signed my name in presence of the subscribing witnesses.

CHARLES OLIVER SHAUB.

Witnesses:
ALBERT H. SCHARRER,
CHARLES J. BRENNAN.

Copies of this patent may be obtained for five cents each, by addressing the "Commissioner of Patents, Washington, D. C."